March 29, 1960

T. A. WEIL 2,930,962

CHOKE INPUT POWER SUPPLIES

Filed Aug. 30, 1957

INVENTOR
THOMAS A. WEIL
By Elmer J. Gorn
ATTORNEY

March 29, 1960 T. A. WEIL 2,930,962
CHOKE INPUT POWER SUPPLIES
Filed Aug. 30, 1957 2 Sheets-Sheet 2
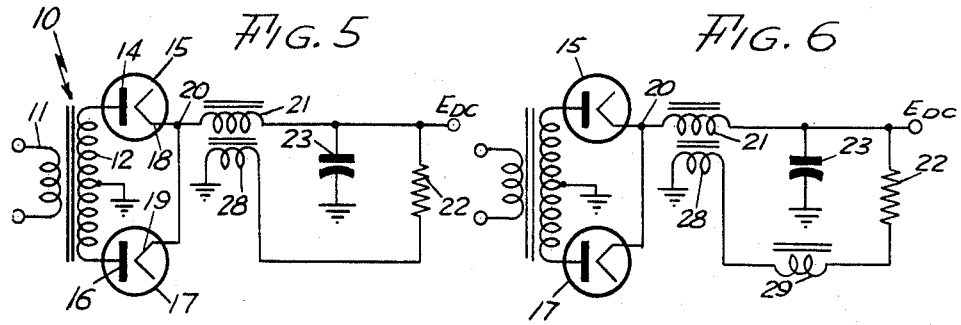
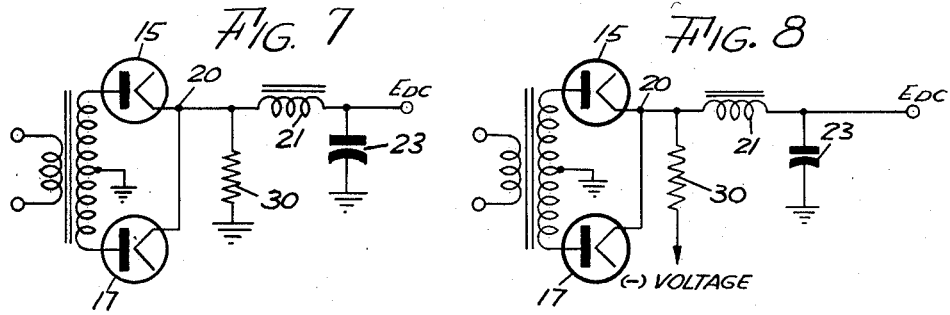
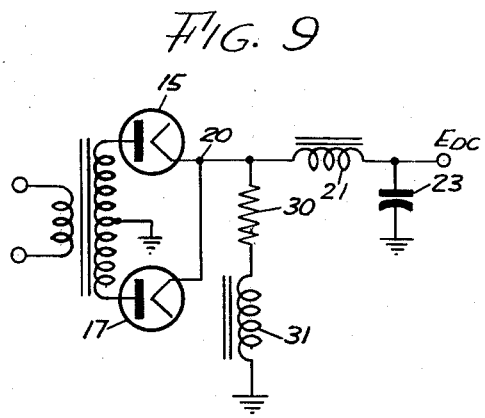
INVENTOR
THOMAS A. WEIL
BY
ATTORNEY

2,930,962

CHOKE INPUT POWER SUPPLIES

Thomas A. Weil, Wellesley, Mass., assignor to Raytheon Company, a corporation of Delaware Application August 30, 1957, Serial No. 681,329

9 Claims. (Cl. 321—16)

This invention relates to a new and novel power supply and more specifically to a power supply having the characteristics of choke-input and where the power supply efficiency is substantially increased over present day designs.

In this invention there is disclosed a system of biasing a choke as a means for improving the over-all efficiency of a power supply by making use of bi-directional flux swing of the core material in said choke. The resulting savings in size and weight are significant since the air gap in a wide range swinging choke usually tends to be very small and the retentivity of the core material usually prevents utilization of even the full unidirectional flux swing available in normal filter choke designs. It is well known that a choke input power supply offers certain advantages when compared to other filter circuits such as providing considerably improved voltage regulation against load variations. This improved regulation is obtained only as long as the instantaneous current drawn from the rectifier does not drop to zero, in which case the steady state D.C. output voltage equals the average value of the rectified power transformer voltage less only the IR and commutation or IX voltage drops. The problem associated with the design of a choke-input power supply is that regulation must be maintained over a wide range of load current which means that the choke must have a high inductance in order to maintain choke-input action at light loads and still the choke must be large enough to carry the full load current. This concept is made more readily understandable by considering the example of a 300-volt D.C. power supply rated at 300 ma. full load operating on a 60-cycle single phase power source. At full load it can be shown that only a 1.0 henry choke is required but at a 30 ma. load which is a substantially light load it can be shown that at least a 10 henry choke would be required. Consideration of a 10 henry choke rated for the 300 ma. full load current would show it to be about twice the size of the power transformer used in the power supply.

Heretofore bleeder resistor circuits have been used to draw the minimum current required to maintain choke-input action, which bleeder if it drew more than 30 ma. would materially reduce the efficiency of the power supply and would require the power transformer and rectifier to be rated for the extra current. Rather than use more than a 30 ma. bleeder and rather than use a 10 henry 300 ma. choke, a second popular solution to this problem has been to use a swinging choke. The simplest and most common type of swinging choke as applied to the example given above would be a 10 henry 30 ma. choke having increased wire size to carry the full load current of 300 ma. but which saturates soon above 30 ma. D.C. Physically, this swinging choke would utilize a small air gap so that choke-input action is maintained at a relatively low value of current, thereby making it possible for the swinging choke to appear practically identical in size to a 1.0 henry 300 ma. choke. The fact that at greater loads than 30 ma. the choke is saturated over much of the cycle unfortunately means that the peak currents drawn from the rectifier tend to become as high as they would be in a condenser input circuit. These high peak currents raise the R.M.S. currents in the power transformer, rectifier, and swinging choke at full load compared to what they would be with a 1.0 henry linear choke (not swinging) and hence result in increased component size. Another inherent disadvantage in this type of choke is that at full load the swinging choke is saturated and therefore does not provide much reduction in ripple as compared with even a condenser input circuit. Certain improvements have been obtained by utilizing both a swinging choke and a linear choke in series in such a manner that the ripple and R.M.S. currents at full load are maintained low by the linear choke while the swinging choke maintains choke-input action down to about 10 percent of the full load current. Chokes have been constructed in this manner and have been termed wide range swinging chokes and for the illustration given here would have a rating of 10/1.0 henries at 30/300 ma. D.C.

In theory a 100 henry 3 ma. swinging choke would be the same size as the 10 henry 30 ma. swinging choke previously described and would therefore permit the use of a smaller bleeder resistor. Unfortunately, it is difficult to achieve even the 10 henries at 30 ma. since the swinging choke must carry a current much larger than the current at which it is to have high inductance; this means that high inductance must be obtained at abnormally low values of ampere turns in the winding. This requires a high mu core, and as the air gap in the core is reduced the limiting mu obtainable is that of the iron core alone. However, as the air gap is closed the retentivity of the core material is no longer minimized by the demagnetizing effect of an air gap, and with the unidirectional excitation as used in present day choke designs the usable mu and flux swing of the core material may be far less than can be obtained with A.C. excitation. This problem is extremely acute since high mu materials also tend to have high retentivity which means that in practice it still works out that it is hard to make a swinging choke at less than approximately 10 percent of the full load current without making the choke excessively large and cumbersome.

In this invention there is described a system that eliminates even the 10 percent power still required to be wasted in a bleeder resistor by utilizing a biasing current to demagnetize the core material, to allow the use of the bi-directional flux swing of the core material, and to eliminate the need for an air gap. The advantage is most pronounced when a high mu material such as Deltamax is used, since a swinging choke made of this core material can be made with a gapless core and can work down to a D.C. current corresponding to about 0.5 oersted magnetizing force or about 1 percent of the full load current. The improvement in over-all efficiency of operation which results from the reduction of the bleeder current from 10 percent to 1 percent of full load current is achieved with a corresponding decrease in over-all size of the choke filter used since the biasing system to be described in this invention makes available twice as much flux swing as is usually available in the normal filter choke design.

Further objects and advantages of this invention will be made more apparent as the description progresses, reference now being made to the accompanying drawings wherein:

Fig. 5 illustrates a first system of obtaining a biasing current from the D.C. output voltage through a resistor;

Fig. 6 illustrates a second system of obtaining a biasing current from the D.C. output voltage through a resistor and a choke;

Fig. 7 illustrates a third system of obtaining a biasing current by means of a resistor connected at the rectifier output;

Fig. 8 illustrates a fourth system of obtaining a biasing current by means of a resistor at the rectifier output connected to a biasing voltage; and Fig. 9 illustrates a fifth system of obtaining a biasing current by means of a resistor at the rectifier output returned to ground through a choke.

Figure 1:
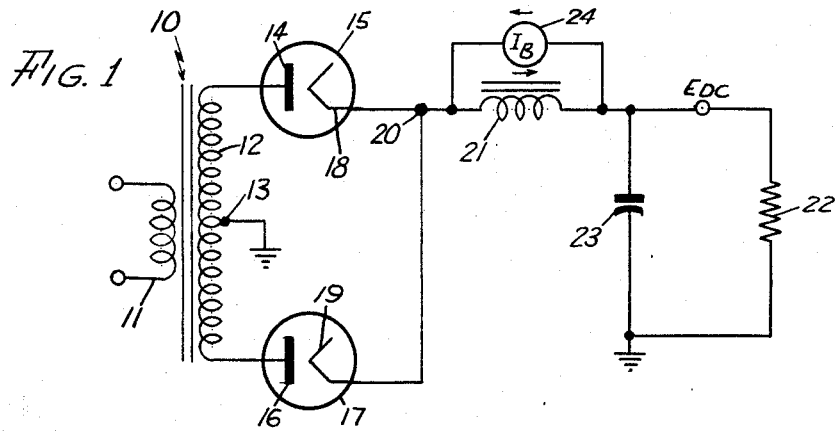
Fig. 1 illustrates a full-wave rectifier connected to a choke-input filter having a biasing current.

Referring now to Fig. 1, there is shown a power supply comprising a power transformer 10 having a primary 11 connected to a suitable power source not illustrated and a secondary winding 12 that is center tapped to ground at reference 13. Opposite ends of secondary winding 12 are connected each to an anode 14 of half wave rectifying tube 15 and anode 16 of half wave rectifying tube 17. The filaments 18 and 19 of tubes 15 and 17 are connected together at reference 20 which thereby completes the full-wave rectifying circuit. The means for heating the filaments are conventional and not illustrated. Connected to the full-wave rectifying circuit at reference 20 is a choke 21 which in turn is connected in series with the parallel combination of load resistor 22 and capacitor 23. The other ends of load resistor 22 and capacitor 23 are connected to ground thereby completing the circuit back to the center tap 13 of secondary coil 12. Choke 21 is preferably constructed of a gapless core which core may now use a high mu material of which an example is the type known commercially as Deltamax. An ideal current source identified as reference 24 is connected in parallel across choke 21 and is used to demagnetize the core of choke 21. The current source identified as reference 24 is for illustrating purposes considered to be an ideal current source arranged to supply current in the direction of the arrow as indicated. Under conditions of full load current the direction of current flow which in this application will be considered as the electron current flow will therefore be from ground through the load resistor 22 to the choke 21 to the filament of the specific half-wave tube that is conducting at that time and back to ground through the center-tapped connection at reference 13. Under conditions where conduction in each of the half-wave rectifying tubes is maintained for their full conducting period, the pulsating voltage at reference 20 which is the output of the full-wave rectifier will be the rectified transformer voltage and will have an essentially constant average value regardless of variations in D.C. load current. The averaging action of choke 21 will result in $E_{dc}$ being a constant voltage which is the average of the pulsating voltage appearing at point 20. When this condition is maintained, the choke-input action of the filter is proper. Under conditions of very small load currents which could also include conditions of zero load, the average value of the voltage appearing at reference 20 would have a tendency to increase or become higher than the average value desired as $E_{dc}$. This condition occurs whenever the instantaneous current in the circuit falls or tends to fall to zero and in so doing fails to maintain conduction of the then-conducting half-wave rectifier tube. Whenever this condition occurs, the filter is no longer acting as a choke-input filter, but, rather, the filter is now acting more nearly as a capacitor input filter.

Ideal current source 24 has a dual purpose. Sufficient current is generated so that at conditions of zero load current, enough current is supplied to the half-wave rectifying tube that is conducting at that instant such that said rectifying tube maintains conduction for the full half cycle and does not cut off, thereby preventing the previously-described sequence of events that would convert the filter to a capacitor input filter. In addition, ideal current source 24 also supplies a reverse circulating current through the windings of choke 21, which current is sufficient to demagnetize the core of said choke. It will be shown later that the demagnetization current need not flow through the main choke coil, but may flow through a separate coil on the same core. The action of this demagnetizing current will be shown in Figs. 3 and 4. It is this demagnetizing or biasing current that enables the core of choke 21 to have bidirectional magnetizing force and thereby allows a high retentivity core to be used without an air gap. It can be seen, therefore, that the current source 24 has a two-fold purpose of supplying a certain amount of load current directly to the rectifying tubes for preventing the instantaneous current from going to zero and also of supplying a certain amount of demagnetizing current.

Figure 2:
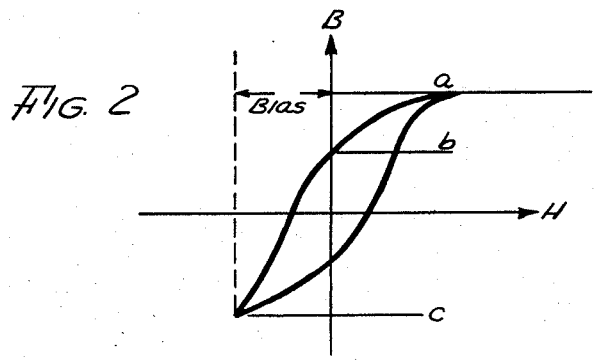
Fig. 2 is a magnetization curve of a conventionally used low retentivity core illustrating the uni-directional flux swing.

Referring now to Fig. 2, there is shown a magnetizing curve for a commonly used core material, which core material has a low retentivity which is evidenced by the small amount of flux left in the core material after the core has been magnetized and the magnetizing force has then been reduced to zero. This point is represented on the zero H line as point $b$ on the graph. It can be seen, therefore, that for present day unidirectional magnetizing force, the maximum amount of choke flux swing obtainable is limited to the variation in flux density as illustrated between points $a$ and $b$ on the curve.

Figure 3:
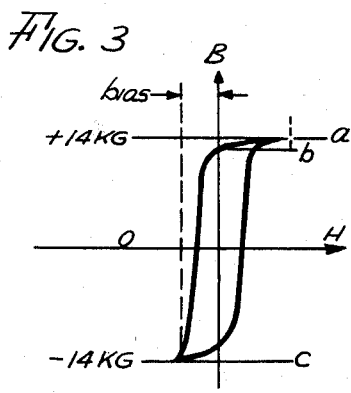
Fig. 3 is a magnetization curve of a high mu high retentivity core.

Referring now to Fig. 3, there is illustrated a magnetization curve of a high retentivity core material which if used in present day swinging chokes without an air gap would allow an extremely small amount of choke flux swing with unidirectional magnetizing force as represented again by the variation between $a$ and $b$. It can be seen, therefore, that in order to get maximum choke flux swing, it is imperative in the present-day swinging chokes to use a core material of low retentivity, as is illustrated in Fig. 2, rather than the high retentivity core illustrated in Fig. 3. Again referring to Fig. 3, there is also shown the effect of demagnetizing the core of the choke by means of a demagnetizing current that flows in a direction opposite to the normal load current, which demagnetizing or bias current will produce a negative magnetizing force and, hence, can completely demagnetize the core in the opposite direction substantially to the point labeled as point $c$ in Fig. 3. The amount of demagnetizing force necessary is identified also as bias, which terminology is used simply to indicate direction and amount of demagnetizing current needed. It can be seen, therefore, that when utilizing a high retentivity core that the total flux swing for normal design would be limited to the range between points $a$ and $b$ whereas by utilizing a biasing or demagnetizing current, the total flux swing realized is now in the range between $a$ and $c$. Similar benefits, although not as great, can also be obtained by applying bias to a choke with a conventional core having characteristics as illustrated in Fig. 2, as indicated by the range $a$ to $c$. The bias needed would be as shown in Fig. 2.

Figure 4:
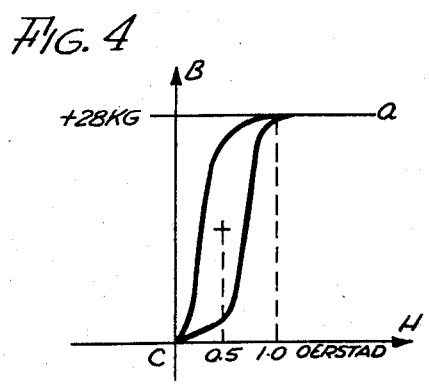
Fig. 4 is a magnetization curve with a high mu high retentivity core illustrating the advantages of using a biasing current in the circuit illustrated in Fig. 1.

Referring now to Fig. 4, there is shown a magnetizing curve for a core of high retentivity similar to that illustrated in Fig. 3, only now in Fig. 4, the reference points have been moved to indicate more fully the benefits to be derived by utilizing a negative or demagnetizing current. By utilizing the biasing current, as illustrated in Fig. 1, and a high retentivity core, it is possible to construct a swinging choke having a gapless core that can now work down to a D.C. current corresponding to about 0.5 oersted or about 1 percent of full load current. Fig. 4 illustrates how bias makes available twice as much flux swing as is usually available in filter choke designs.

The circuit illustrated in Fig. 1 utilizes an idealized current source which unfortunately is not always conveniently available in practical circuits, and, as a consequence, Figs. 5, 6, 7, 8 and 9 are included to illustrate and describe at least five convenient systems for obtaining a biasing current that will perform the functions of the idealized current source illustrated in Fig. 1. For example, Fig. 5 is similar to Fig. 1 with the exception that a separate winding 28 fed from the D.C. output voltage is connected to ground through resistor 22, which D.C. voltage and resistor approximates a high-impedance current source. The polarity of coil 28 and turns ratio are so apportioned that any tendency for the instantaneous current in choke 21 to fall to zero is immediately countered by a voltage induced in said choke by the action of coil 28, thereby causing a minimum current to flow in choke 21 at all times. Current flowing through coil 28 will supply a small demagnetizing effect on the core of coil 21, thereby permitting a total flux swing of the core, as illustrated in Fig. 4. It is also apparent that the system illustrated in Fig. 5 may use any independent D.C. source rather than the output of the filter system as illustrated.

The second system illustrated in Fig. 6 is very similar to the system illustrated in Fig. 5 with the exception that the separate winding 28 on the core of choke 21 is connected through an additional choke 29 placed in series with coil 28 and resistor 22. The effect of new choke 29 placed in the circuit is to approximate a high-impedance current source and reduces the effect of the voltage variations induced in coil 28. Both systems illustrated in Figs. 5 and 6 differ from that shown in Fig. 1 in that the demagnetizing current in Fig. 1 must flow in a direction opposite to the normal load current while in Figs. 5 and 6 the demagnetization current is fed into a separate coil as shown. In all other respects, the operation is the same.

Referring now to Fig. 7, there is shown a third system for obtaining a biasing current which includes the placement of a separate resistor 30 from the input 20 of choke 21 to ground. Resistor 30 being placed at the rectifier output will have the effect during portions of the cycle when the rectifier output voltage is less than the D.C. output voltage identified as $E_{dc}$ of completing the discharge circuit for capacitor 23 and there will occur the tendency for capacitor 23 to discharge through choke 21, through resistor 30 and hence back through ground. It can be seen therefore that this discharging of capacitor 23 through choke 21 will provide the required demagnetizing current for choke 21. In addition, resistor 30 will maintain conduction of the rectifying tubes over substantially the whole voltage cycle. Resistor 30 will therefore have the effect of maintaining choke-input action and also supplying the demagnetization current.

Referring now to Fig. 8, there is shown a biasing system similar to that illustrated in Fig. 7 with the exception that the external resistor 30 connected to point 20 is not connected to ground but rather is connected to a negative potential source, not illustrated. This negative potential source overcomes the imperfection of the system illustrated in Fig. 7 and is a very simple and effective way of approximating the ideal current source illustrated in Fig. 1.

The system illustrated in Fig. 9 is very similar to that illustrated in Fig. 7 with the exception that resistor 30 is in turn connected to another choke 31 which is in turn connected to ground. The operation of this system is very similar to the operation of the system illustrated in Fig. 8. The use of choke 31 eliminates the need for the negative voltage source illustrated in Fig. 8.

This completes the description of the embodiment of this invention. However, many modifications of this invention will be apparent to those skilled in the art. For example, many combinations and modifications of the various systems illustrated in the above drawings can easily be imagined. For example, it is even envisioned that permanent magnet bias on the core of the swinging choke might be feasible as a means of producing the demagnetizing force and further all of the systems illustrated herein may be used in combination with a linear choke which may or may not be physically combined with the disclosed biased choke. Accordingly, it is desired that this invention not be limited to the specific details of the embodiments illustrated herein, except as defined by the appended claims.

What is claimed is:

1. A power supply adapted to be connected to a load circuit and comprising a rectifying circuit connected to a choke coil having a core, and a biasing current supply circuit connected to said coil, said biasing circuit constituting the sole means for demagnetizing said core and for counteracting the tendency of the instantaneous current in said rectifying circuit to go to zero.

2. A power supply adapted to be connected to a load circuit and comprising a rectifying circuit connected to a choke coil having a core, and a biasing current supply circuit connected to said coil, said biasing circuit constituting the sole means for providing bi-directional excitation of said core and for preventing the instantaneous current in said rectifying circuit from going to zero.

3. A power supply adapted to be connected to a load circuit and comprising a rectifying circuit connected to a choke coil having a saturable core of high retentivity, and a biasing current supply circuit connected to said coil, said biasing circuit constituting the sole means for providing demagnetizing excitation of said saturable core and for counteracting the tendency of the instantaneous current in said rectifying circuit to go to zero.

4. A power supply adapted to be connected to a load circuit and comprising a rectifying circuit connected to a choke coil having a core, and a biasing circuit including a separate coil wound on said core and a current supply circuit for causing a biasing current to flow through said separate coil, said biasing circuit constituting the sole means for demagnetizing said core when substantially zero current is flowing through said choke coil and for counteracting the tendency of the instantaneous coil of said rectifying circuit to go to zero.

5. A power supply adapted to be connected to a load circuit and comprising a rectifying circuit connected to a choke coil having a core, and a biasing circuit including a separate coil wound on said core, a second choke coil connected in series with said separate coil, and a current supply circuit for causing a biasing current to flow through said separate winding, said biasing circuit constituting the sole means for demagnetizing said core when substantially zero current is flowing through said choke coil and for counteracting the tendency of the instantaneous coil of said rectifying circuit to go to zero.

6. A power supply adapted to be connected to a load circuit and comprising a rectifying circuit connected to a choke coil, a resistive means connected to said choke coil for supplying a biasing current to said coil, said resistive means constituting the sole means for demagnetizing said core and for counteracting the tendency of the instantaneous current in said rectifying circuit to go to zero.

7. A power supply adapted to be connected to a load circuit and comprising a rectifying circuit connected to a choke coil, a resistive means connected to said choke coil and to a source of substantially direct voltage for supplying a biasing current to said coil, said resistive means constituting the sole means for demagnetizing said core and for counteracting the tendency of the instantaneous current in said rectifying circuit to go to zero.

8. A power supply adapted to be connected to a load circuit and comprising a rectifying circuit connected to a choke coil, a biasing circuit including a resistive means connected to said choke coil, and a second choke coil connected to said resistive means, said biasing circuit constituting the sole means for demagnetizing said core and for counteracting the tendency of the instantaneous current in said rectifying circuit to go to zero.

9. A power supply adapted to be connected to a load circuit and comprising a rectifying circuit connected to a choke coil having a core, and a substantially constant current source connected to said coil for supplying a bias current to said coil, said constant current source constituting the sole means for providing demagnetizing excitation to said core and for counteracting the tendency of the instantaneous current in said rectifying circuit to go to zero.

References Cited in the file of this patent

UNITED STATES PATENTS

| 2,710,938 | Lee | June 14, 1955 |
| 2,790,127 | Hamilton | Apr. 23, 1957 |

FOREIGN PATENTS

| 500,226 | Italy | Nov. 17, 1954 |